(12) United States Patent  (10) Patent No.: US 8,885,721 B2
Tourapis et al.  (45) Date of Patent: Nov. 11, 2014

(54) ENCODER OPTIMIZATION OF STEREOSCOPIC VIDEO DELIVERY SYSTEMS

(71) Applicant: Dolby Laboratories Licensing Corporation, San Francisco, CA (US)

(72) Inventors: Alexandros Tourapis, Milpitas, CA (US); Walter J. Husak, Simi Valley, CA (US); Athanasios Leontaris, Mountain View, CA (US); David Ruhoff, Marina del Rey, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/028,438

(22) Filed: Sep. 16, 2013

(65) Prior Publication Data
US 2014/0118491 A1 May 1, 2014

Related U.S. Application Data

(63) Continuation of application No. 13/054,912, filed as application No. PCT/US2009/050815 on Jul. 16, 2009, now abandoned.

(60) Provisional application No. 61/082,220, filed on Jul. 20, 2008.

(51) Int. Cl.
*H04N 7/26* (2006.01)
*H04N 19/124* (2014.01)
(Continued)

(52) U.S. Cl.
CPC ....... *H04N 13/0048* (2013.01); *H04N 19/0009* (2013.01); *H04N 19/0046* (2013.01);
(Continued)

(58) Field of Classification Search
CPC ............................ H04N 7/50; H04N 13/0048
See application file for complete search history.

(56) References Cited

U.S. PATENT DOCUMENTS

| | | | |
|---|---|---|---|
| 4,027,333 A | 5/1977 | Kaiser | |
| 4,523,223 A | 6/1985 | Lueder | |

(Continued)

FOREIGN PATENT DOCUMENTS

| | | |
|---|---|---|
| DE | 19619598 | 11/1997 |
| JP | 06-105027 | 4/1994 |

(Continued)

OTHER PUBLICATIONS

Klaas Schuur et al. "Preliminary Results on Disparity Coding with in-loop Median Filter" ISO/IEC JTC1/SC29/WG11 MPEG02/M9017, Shanghai, Oct. 2002.

(Continued)

*Primary Examiner* — Sath V Perungavoor
*Assistant Examiner* — Kate Luo

(57) ABSTRACT

Controlling a feature of an encoding process for regions of an image pattern representing more than one image when the regions include an amount of disparity in the represented images that would result in cross-contamination between the represented images if encoded with the feature. The control may be, for example, any of, turning the encoding feature off, using the encoding feature less often than when encoding an image pattern representing a single image, negatively biasing the encoding feature, and enabling the encoding feature for regions determined to have zero or near zero disparity and disabling the feature for all other regions. The represented images comprise, for example, any of a stereoscopic view, multiple stereoscopic views, multiple views of a same scene, and multiple unrelated views.

17 Claims, 14 Drawing Sheets

(51) Int. Cl.
*H04N 19/39* (2014.01)
*H04N 19/103* (2014.01)
*H04N 19/17* (2014.01)
*H04N 19/176* (2014.01)
*H04N 19/172* (2014.01)
*H04N 19/136* (2014.01)
*H04N 19/61* (2014.01)
*H04N 19/122* (2014.01)
*H04N 19/597* (2014.01)
*H04N 19/105* (2014.01)
*H04N 19/117* (2014.01)
*H04N 19/174* (2014.01)
*H04N 19/00* (2014.01)
*H04N 13/00* (2006.01)
*H04N 19/70* (2014.01)

(52) U.S. Cl.
CPC ..... *H04N 19/00018* (2013.01); *H04N 19/0026* (2013.01); *H04N 19/00884* (2013.01); *H04N 19/00278* (2013.01); *H04N 19/00266* (2013.01); *H04N 19/00139* (2013.01); *H04N 19/00781* (2013.01); *H04N 19/00084* (2013.01); *H04N 19/00769* (2013.01); *H04N 19/00024* (2013.01); *H04N 19/00066* (2013.01); *H04N 19/00272* (2013.01); *H04N 19/00* (2013.01)
USPC .................................................. 375/240.16

(56) References Cited

U.S. PATENT DOCUMENTS

| | | | |
|---|---|---|---|
| 5,416,510 A | 5/1995 | Lipton | |
| 6,501,796 B1* | 12/2002 | Dusseux et al. | 375/240.12 |
| 6,909,469 B2 | 6/2005 | Adams | |
| 2006/0082575 A1 | 4/2006 | Auberger | |
| 2007/0030356 A1 | 2/2007 | Yea | |
| 2007/0064800 A1* | 3/2007 | Ha | 375/240.12 |
| 2007/0182728 A1* | 8/2007 | Fujimori | 345/204 |
| 2008/0089428 A1* | 4/2008 | Nakamura et al. | 375/240.26 |
| 2009/0002481 A1 | 1/2009 | Kim | |

FOREIGN PATENT DOCUMENTS

| | | |
|---|---|---|
| JP | 2001-285895 | 10/2001 |
| JP | 2002-518897 | 6/2002 |
| JP | 2002-525989 | 8/2002 |
| JP | 2003-319417 | 11/2003 |
| JP | 2007-036368 | 2/2007 |
| JP | 2007-180981 | 7/2007 |
| JP | 2008-022549 | 1/2008 |
| JP | 2008-167267 | 7/2008 |
| RU | 2237283 | 9/2004 |
| SU | 1072289 | 2/1984 |
| WO | 03056843 | 7/2003 |
| WO | 2005120085 | 12/2005 |
| WO | 2007/081756 | 7/2007 |
| WO | 2007/081838 | 7/2007 |
| WO | 2007/092255 | 8/2007 |
| WO | 2008023917 | 2/2008 |
| WO | 2008/035654 | 3/2008 |
| WO | 2010/011556 | 1/2010 |
| WO | 2010/011557 | 1/2010 |

OTHER PUBLICATIONS

D. C. Hutchingson, "Introducing DLP 3-D TV", http://www.dlp.com/downloads/Introducing DLP 3D HDTV Whitepaper. pdf, 2008.
"Advanced Video Coding for Generic Audiovisual Services" ITU H.264, Mar. 2010, pp. 1-653.
"VC-1 Compressed Video Bistream Format and Decoding Process" SMPTE Standard 421M-2006; pp. 1-493.
"Generic Coding of Moving Pictures and Associated Audio Information: Video" ITU-T, Feb. 2000, pp. 1-220.
JVT Reference software Version H.264, Karsten Suhring, HHI. 2010.
Latzel, et al., "A Robust Motion Detection and Estimation Filter for Video Signals", 2001 IEEE, pp. 381-384.
Yin, et al., "Fast Decision on Picture Adaptive Frame/Field Coding for H.264", proc. of SPIE vol. 5960, pp. 1-8, 2005.
Bjontegaard, et al., "Adaptive Deblocking Filter", IEEE Transactions on Circuits and Systems for Video Technology, vol. 13, No. 7, Jul. 2003.
Tseng, et al., "Compatible Video Coding of Stereoscopic Sequences using MPEG-2's Scalability and Interlaced Structure", 1994.
3-D film from Wikipedia; the free encyclopedia, 2009.
"Report, Investigation Research on 3D Contents", Mar. 2006, Digital Content Association of Japan, pp. 140-146.
Oka, et al. "Light Field Information Compression for Free Viewpoint Televisions", Information Processing Society Research Report, vol. 2003, No. 125, Information Processing Society of Japan, Dec. 19, 2003, pp. 97-102.
Sakai et al. "Quantization of Disparity Vectors for Twin Camera Stereoscopic Image Transmission", Picture Coding Symposium (PCSJ96) 11th Symposium Materials, Oct. 1996, The Institute of Electronics, Information and Communication Engineers, Image Engineering Research Advisory Committe, pp. 91-92.
Tsuzuki et al., "MC/DC Selective Warping Prediction based on Variable-Size-Blocks for D-11-6 Stereo Video", The Institute of Electronics, Information and Communication Engineers, 2001 Information System Society Convention Lecture Collection, Aug. 29, 2011, p. 91 on Variable-Size-Blocks for D-11-6 stereo video, The Institute of Electronics, Information and Communication Engineers, 2001.
Li, Min et al. "DCT-Based Phase Correlation Motion Estimation", Proc. of 2004 Int. Conf. on Image Processing (ICIP 2004), Oct. 2004, vol. 1, pp. 445-448.
Okubo, Sakae "Impress Standard Textbook Series, Third Revised Edition, H.264/AVC Textbook", First Edition, Jan. 1, 2009, Impress R&D, pp. 311-312.
Katayama, Miwa A Method for High-Efficiency Compression of Twin Lens Stereoscopic Hi-Vision Images: Comparison Between Two Types of High-Efficiency Compression Coding, NHK Science & Technology Research Laboratories News, May 1999, pp. 14-20 (No. 111) Japan Broadcasting Corporation Science & Technology Research Laboratories.
2D/3D Switchable Displays by Sharp, 2003.

* cited by examiner

FIG. 12

ENCODER OPTIMIZATION OF STEREOSCOPIC VIDEO DELIVERY SYSTEMS

CROSS-REFERENCE TO RELATED APPLICATIONS

This application claims priority to U.S. patent application Ser. No. 13/054,912 filed Jan. 19, 2011, which claims priority to International Patent Application No. PCT/US2009/050815 filed Jul. 16, 2009, which claims priority to U.S. Provisional Application No. 61/082,220, filed 20 Jul. 2008, hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to Video coding and more specifically to multi-image and stereoscopic video coding.

2. Description of Related Art

In recent years, content providers have become interested in the delivery of stereoscopic (3D) content into the home. This interest is driven by the increased popularity and production of 3D material, but also the emergence of several stereoscopic devices that are already available to the consumer. Although several systems have been proposed on the delivery of stereoscopic material to the home that combine specific video view "arrangement" formats with, primarily, existing video compression technologies such as ISO MPEG-2, MPEG-4 AVC/ITU-T H.264, and VC-1, these systems do not provide any information on how the video encoding process should be performed. This has consequently resulted in poorly designed stereo video encoding solutions with subpar performance, which has been detrimental in the adoption of such systems.

SUMMARY OF THE INVENTION

The present inventors have realized the need to develop efficient coding systems for multi-image video (e.g., multi-view and stereoscopic or 3D video) and other new features and be compliant with standard video codecs (e.g., monoscopic video compatible codecs). In one embodiment, the present invention provides a method of encoding images comprising the step of controlling an encoding feature of an encoding process for regions of an image pattern representing more than one image to be encoded by the encoding process when the regions include an amount of disparity in the represented images that would result in cross-contamination between the represented images if encoded with the feature. The step of controlling an encoding feature comprises, for example, at least one of turning the encoding feature off, using the encoding feature less often than when encoding an image pattern representing a single image, negatively biasing the encoding feature, instituting a relative degree of change in the encoding feature where the relative degree of change is based on the disparity, at least partially enabling the encoding feature for regions determined to have zero or near zero disparity and disabling the feature for all other regions, and enabling the encoding feature for a region having relatively low or no stereoscopic disparity when compared to a corresponding region of another image in the pattern, disabling the encoding feature for a region having relatively higher stereoscopic disparity, enabling the encoding feature for regions in background locations and disabling the encoding feature for regions in foreground locations, and at least partially enabling the feature for regions determined to have zero or near zero motion and disabling the feature for all other regions.

The represented images may comprise, for example, at least one of a stereoscopic view, multiple stereoscopic views, multiple views of a same scene, and multiple unrelated views.

In one embodiment, the method further comprises the step of classifying the disparity of a region as being one of high disparity, low disparity, and zero disparity, and using the disparity classification to direct the step of controlling. In one embodiment, the amount of disparity comprises an amount of disparity between neighboring regions in the represented images. In one embodiment, the amount of disparity comprises an amount of disparity between corresponding regions in the represented images. In one embodiment, the amount of disparity comprises an amount of stereoscopic disparity. In one embodiment, the disparity is determined by bandpass filtering the images, and the bandpass filtering may be applied both vertically and horizontally. In one embodiment, the disparity comprises differences in a location of the regions. In one embodiment, the amount of disparity comprises an amount of illumination change in the corresponding regions, where the corresponding regions comprise, for example, corresponding regions in a stereoscopic pair of images. In one embodiment, the amount of disparity comprises an amount of motion estimation between the images.

In one embodiment, the amount of disparity comprises an amount of estimated motion in corresponding regions of the more than one image. The motion estimation comprises, for example, at least one of a feature based motion estimation (e.g., an Enhanced Predictive Zonal Search (EPZS)), a pixel based motion estimation, a block based motion estimation, phase based motion estimation, frequency domain based motion estimation, pixel recursive motion estimation, true motion region motion estimation, and Bayesian based motion estimation.

In various embodiments, the encoding feature comprises at least one of de-blocking, transform, and quantization, motion compensation, inter-frame prediction, intra-frame prediction, a color format and sampling configuration. The encoding process comprises, for example, a video encoding process. In one embodiment, the encoding process comprises High Definition (HD) video encoding. In one embodiment, the encoding process comprises scalable video coding. The scalable video coding comprises, for example, the scalable video coding extension of the AVC/H.264 standard. In various embodiments, the encoding process comprises any video codecs such any of MPEG codecs, including MPEG-1/MPEG-2, MPEG-4 Part 2, MPEG-4 AVC/H.264, other proprietarily codecs AVS, VC1, RealVideo, Ont VP6/VP7, or other coding techniques including the Multi-View Coding Video extension of AVC, Motion JPEG and Motion JPEG-2000.

The image pattern comprises, for example, a "black" and "white" checkerboard arrangement of pixels where the "black" pixels comprise pixels of an image of a first channel in a stereoscopic view and the "white" pixels comprise pixels of a second channel in the stereoscopic view. In essence, for example, the image pattern comprises a "multi-colored" "checkerboard" arrangement of pixels where each individual "color" of the "checkerboard" comprises pixels of an individual one of the more than one images. The "multi-colored" "checkerboard" may comprise, for example, more than two "colors." Stated more generally, the image pattern comprises a "multi-colored" arrangement of pixels where each individual "color" of the arrangement comprises pixels of an individual one of the more than one images. The arrangement may comprise, for example, any of at least one of rows and columns allocated to each "color"/image, and a modulo-spacing arrangement of locations in the arrangement allocated to each "color"/image.

In various embodiment, for example, the encoding process comprises one or more of field based encoding, and field based encoding performed in at least one of a picture level and a macroblock level.

The amount of disparity may be computed, for example, via a process comprising at least one of a picture level analysis, analysis of a slice, a region level analysis, a macro-block, and block level analysis. In one alternative, the amount of disparity may be determined in a step comprising computing distortion. Computing distortion may comprise, for example, at least one of separating stereo view samples and computing distortion based on a 3D view of the separated samples, comparing the original images to images represented in the "checkerboard" after being decoded, comparing original pre-image pattern images to the images represented in the image pattern after being decoded. The computed distortion comprises, for example, at least one of luma and chroma, a comparison to at least one of the images prior to being represented in the image pattern. In yet another alternative, disparity itself is determined in a step comprising computing distortion wherein the distortion is computed from an original pair of 3D images that are subsequently encoded into the image pattern and then comparing the original pair of images to the images decoded from the image pattern.

The method may further comprise, for example, a step of reducing quality of at least one image set of the represented images. Reducing quality may be performed, for example, based on a content of the image set being reduced, and/or based on a pricing model that takes into account a desired and acceptable level of quality of the image sets. In various embodiments, the image sets within the represented images are prioritized based on a desired quality, and the step of reducing quality, if performed on an image set, is regulated according to the image set priority such that a lower priority image set is reduced in quality further than a higher priority image set. Further intelligence in reducing quality may also be utilized, for example, where the image sets within the represented images are prioritized based on a desired quality, and the step of reducing quality, if performed on an image set, is regulated according to the image set priority and size of the image set such that a lower priority image set is reduced in quality further than a higher priority image set unless a higher priority image set is too large and additional space or bandwidth is needed to carry all of the image sets. The reduction in quality need not be uniform across an image set, that is it could be performed only on a region or a macroblock/block of an image set, and may be performed, for example, on a view of a stereoscopic image set.

Further, the reduction in quality may be performed in a subregion of an image and not for the entire image. For example, this could be done only for a region with high texture but not anywhere else. Alternatively, we could have within the same image pixels corresponding to one view/sub-image in a region being of higher quality and vice versa for other regions The invention may also be embodied in a method comprising the steps of, receiving a stereoscopic pair of images, combining the images into an image pattern, evaluating at least one tool for encoding the image pattern, and applying at least one of the encoding tools in an encoding process if an amount of cross-contamination between the images in either the encoding or corresponding decoding processes is below a predetermined cross-contamination threshold, wherein the encoding process comprises an existing video format. The step of applying at least one of the encoding tools comprises, for example, prioritizing regions of the images and applying the encoding tools to each region according to the priority. The prioritization comprises, for example, high priority regions where at least one encoding tool is applied and low priority regions where the coding tools are not necessarily applied. In one alternative, the prioritization is based on a region passing at least one predetermined threshold. The at least one predetermined threshold comprises, for example, at least on of a stereo disparity, motion detection, luminance difference, and chrominance difference thresholds. The threshold/thresholds may be fixed/predefined by the application or characteristics of the encoding process, random (or pseudorandom) again given the application, or adaptive given the content or earlier decisions performed. Decisions could be driven by complexity, quality, and of course correlation of neighboring (both temporally and spatially) samples. The existing video format comprises, for example, a video format not developed for encoding stereoscopic images, and may be, for example, a scalable video coding extension of the AVC/H.264 standard.

The step of evaluating comprises, for example, at least one of stereo disparity analysis, motion estimation analysis, luminosity analysis, analysis from multi-pass encoding, analysis from pre-processing and earlier passes, and Motion Compensation Temporal Filtering (MCTF) analysis. The at least one tool comprises at least one of a de-blocking tool and a prediction tool.

This method may further comprise the step of applying at least one of the encoding tools, and may yet further comprises applying at least one of the encoding tools at a reduced level if the amount of cross-contamination is within an acceptable pre-determined cross-contamination range. Cross-contamination comprises, for example, at least one of luma, chroma, blocking, and stereo view contamination.

The step of evaluating comprises, for example, a cost process. The cost process may comprise, for example, a function of computational costs and contamination costs. The cost process may comprise a lagrangian cost process or costing process.

This method may further comprise the step of exploiting Stereo View Masking (SVM) by applying at least one of the encoding tools in an encoding process in cases where $\mu_{LV} > \mu_{RV}$, or $\mu_{LV} < \mu_{RV}$ resulting in a higher bias towards the quality of one view. In one alternative, exploiting stereo view masking (SVM) may be embodied by providing a lower quality version of one of the stereoscopic pair of images and alternating the lower quality version between subsequent left and right views of the stereoscopic pair of images. In yet another alternative, exploiting stereo view masking (SVM) may be embodied by providing a varying quality of at least one of the stereoscopic pair of images wherein the quality is selected based on a priority of the image. In still yet another alternative, exploiting Stereo View Masking (SVM) may be embodied by applying at least one of the encoding tools in an encoding process if an amount of cross-contamination in one of the images in either the encoding or corresponding decoding processes is above a first predetermined SVM cross-contamination threshold and an amount of cross-contamination in the other image in either the encoding or corresponding decoding processes is below a second predetermined SVM cross-contamination threshold.

The invention may also be embodied as an encoding device, comprising, an input port configured to receive a bit pattern comprising image data to be encoded, an encoder comprising a set of tools configured to encode aspects of the image data to be encoded, and an evaluation processor configured to, evaluate at least one factor between corresponding regions of a set of images embedded in the bit pattern of the image to be decoded, and regulate an amount of use of at least one of the tools based on said evaluation. The factor comprises, for example, at least one of disparity, luminance, chrominance, and motion estimation. The set of tools comprises, for example, at least one of a de-blocking tool and a motion prediction tool. The encoder comprises, for example, a scalable video encoder, and may further comprise an extension of an existing video format.

In one embodiment, the video format comprises AVC/H.264. In another embodiment, the video format comprises one of AVS and VC1.

Regulation by an evaluation processor may comprise, for example, negatively biasing at least one of the tools if at least one of the evaluated factors exceeds a pre-determined threshold. In one alternative, regulation by the evaluation processor comprises negatively biasing at least one of the tools by an amount that varies depending on a priority level associated with the evaluated factors. In another alternative, regulation by the evaluation processor comprises reducing an effect of use of at least one of the tools if at least one of the evaluated factors exceeds a pre-determined threshold.

In one embodiment, the set of images comprises one of a stereoscopic view, multiple stereoscopic views, multiple views of a same scene, and multiple unrelated views.

Portions of both the device and methods, and other embodiments may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a diagram illustrating 4:2:0 content according to an embodiment of the present invention. The diagram illustrates that modulo 4 integer samples have no cross view contamination for motion estimation and compensation purposes. Limiting motion estimation to those positions can have considerable impact on both coding performance and complexity;

DESCRIPTION OF THE PREFERRED EMBODIMENTS

Stereoscopic video formats may include row interleaved (field sequential), checkerboard, pixel/column interleaved, side by side and others, which by nature result in very different image characteristics compared to normal images and for which such generic video codecs have been originally optimized. Generic video codecs such as AVC/H.264 assume that all pixels within an encoded picture belong to the same image (or in this case view) and have certain spatio-temporal characteristics that could be exploited using techniques such as spatio-temporal prediction, e.g., motion estimation and intra prediction, transform and quantization, and de-blocking among others.

Figure 1:
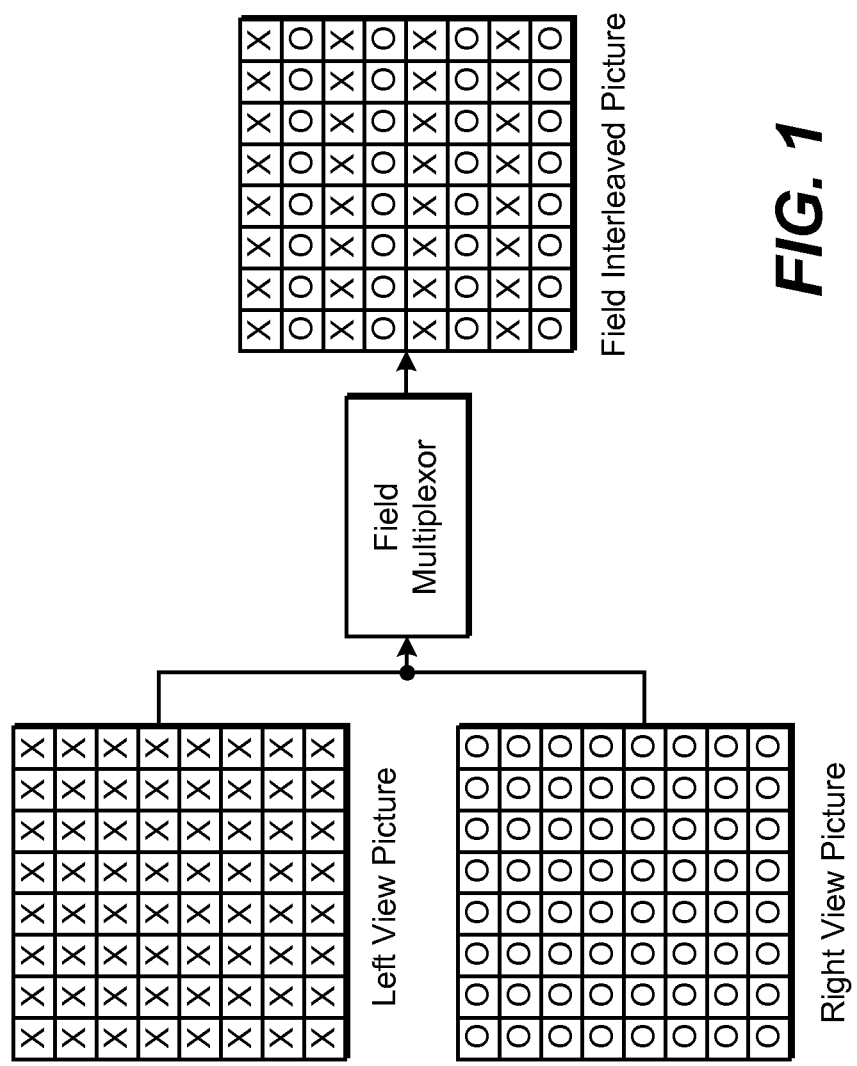
FIG. 1 is a diagram illustrating row sequential/field interleaved arrangement for the delivery of Stereoscopic material.

These characteristics, however, may not always exist within these stereo image formats impairing or restricting the performance of such tools. In particular, the row interleaved approach arranges two stereo view images into a single image by the use of appropriate vertical filtering and decimation prior to compression as can be seen in FIG. 1.

Figure 2:
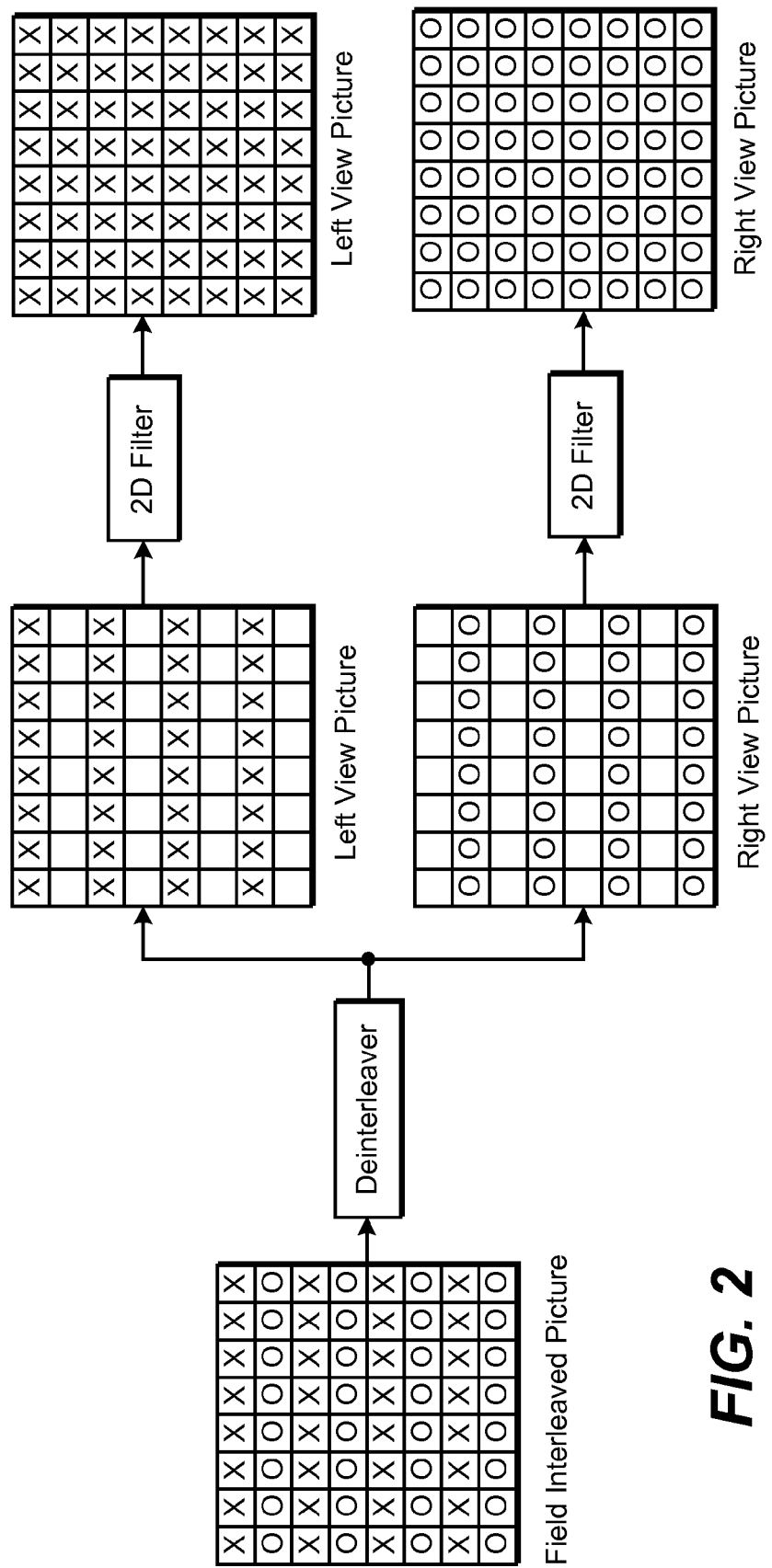
FIG. 2 is a diagram illustrating Stereo view reconstruction of field interleaved pictures.

Similarly the reconstruction process involves extracting the corresponding pixels from each view from the combined image, and generating the missing samples using appropriate filters as can be seen in FIG. 2. This suggests that spatial correlation among vertically adjacent pixels is considerably lower and special care should be taken when encoding such pictures so as to not contaminate the information of one view with that of another. If an encoding solution does not adhere to such rules, this may result in artifacts that could be rather visible when viewing the content with an appropriate stereoscopic display.

Figure 3:
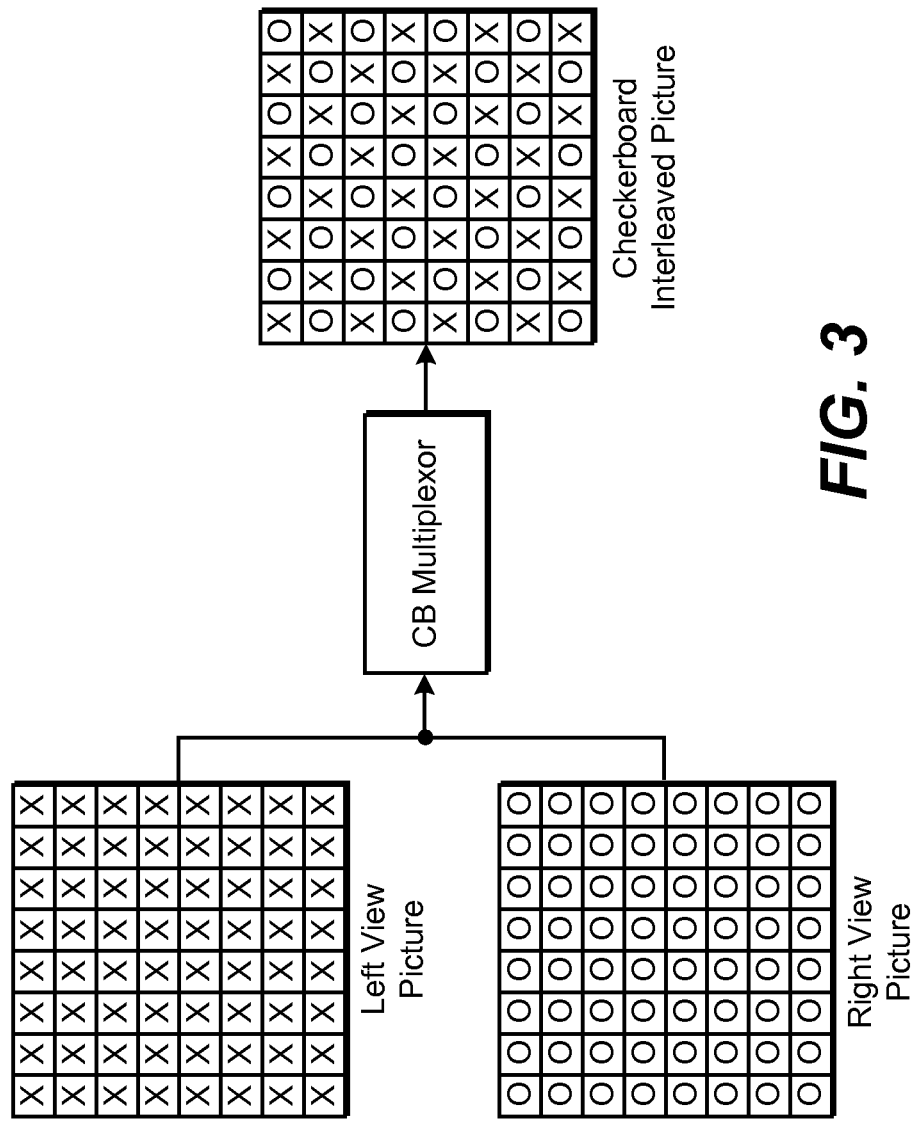
FIG. 3 is a diagram illustrating a checkerboard interleaved arrangement for the delivery of stereoscopic material according to an embodiment of the present invention.
Figure 4:
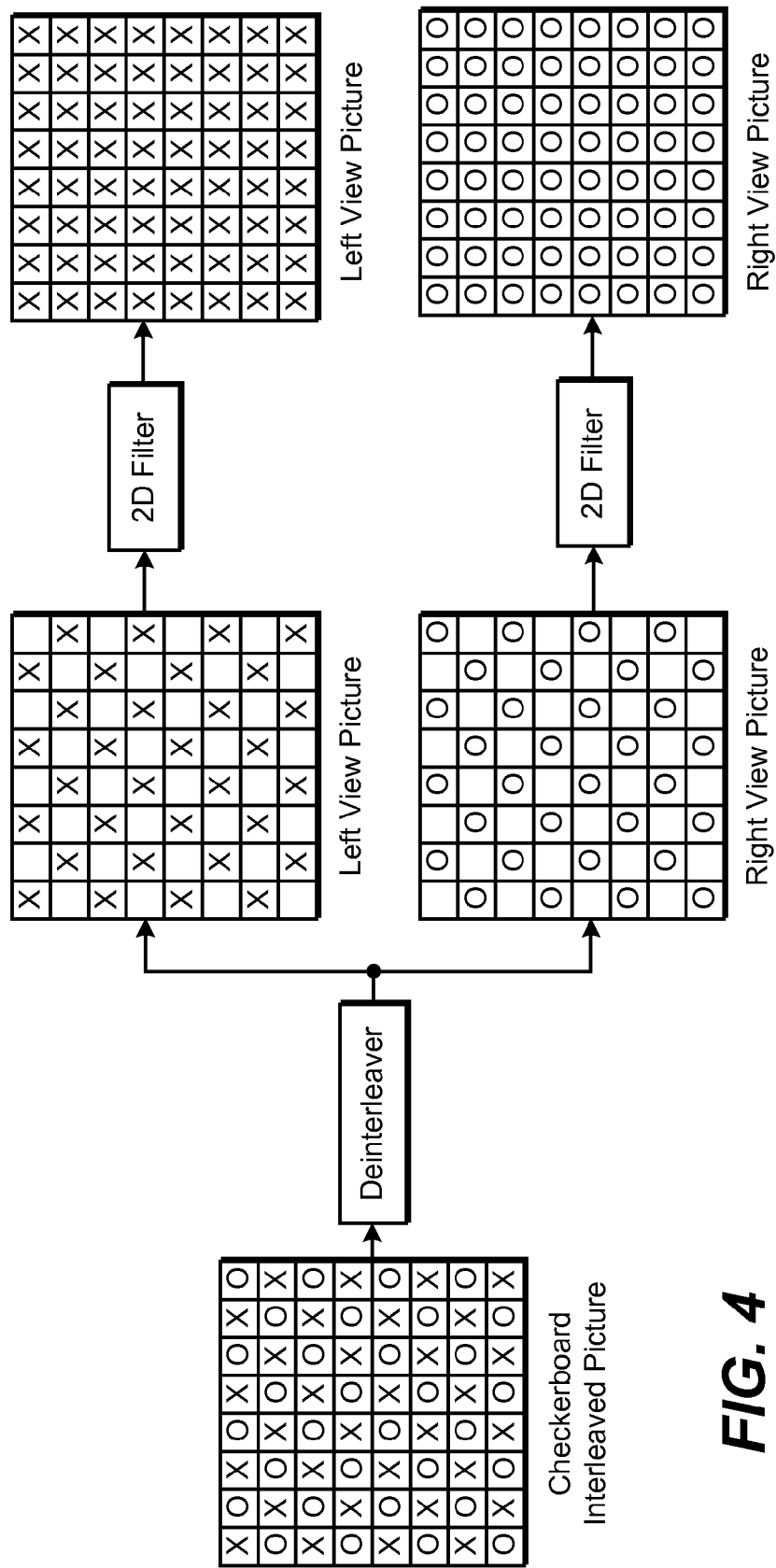
FIG. 4 is a diagram illustrating Stereo view reconstruction of checkerboard interleaved pictures according to an embodiment of the present invention.

A checkerboard interleaving method (e.g., FIG. 3 & FIG. 4), would result in similar or even more emphasized problems. However, the checkerboard method is of particular interest because of improved resolution compared to other formats, and since it is currently supported by available display devices. The present inventors have realized the need for the creation and adoption of a stereoscopic video format for consumer applications assuming, however, the creation of appropriate video encoding systems with acceptable quality performance. The pixel arrangement, however, presents increased challenges to existing video encoders, which should be considered during the encoding process.

The present invention encompasses several methods, devices, and structures that may be embodied in a variety of ways, each of which may be considered during the encoding process which may result in either improved coding performance, measured in increased quality given a fixed bit-rate or equivalently reduced bit-rate given a fixed quality target, or/and in complexity reduction of such encoding solutions with little if any impact in coding performance. The methods presented may be applied to any present or future video codec, including scalable solutions such as the scalable video coding extension (SVC) of AVC/H.264, but also other arrangements which may dictate the arrangement within a single picture of more than 2 views, i.e., for multi-view video coding.

Figure 11:
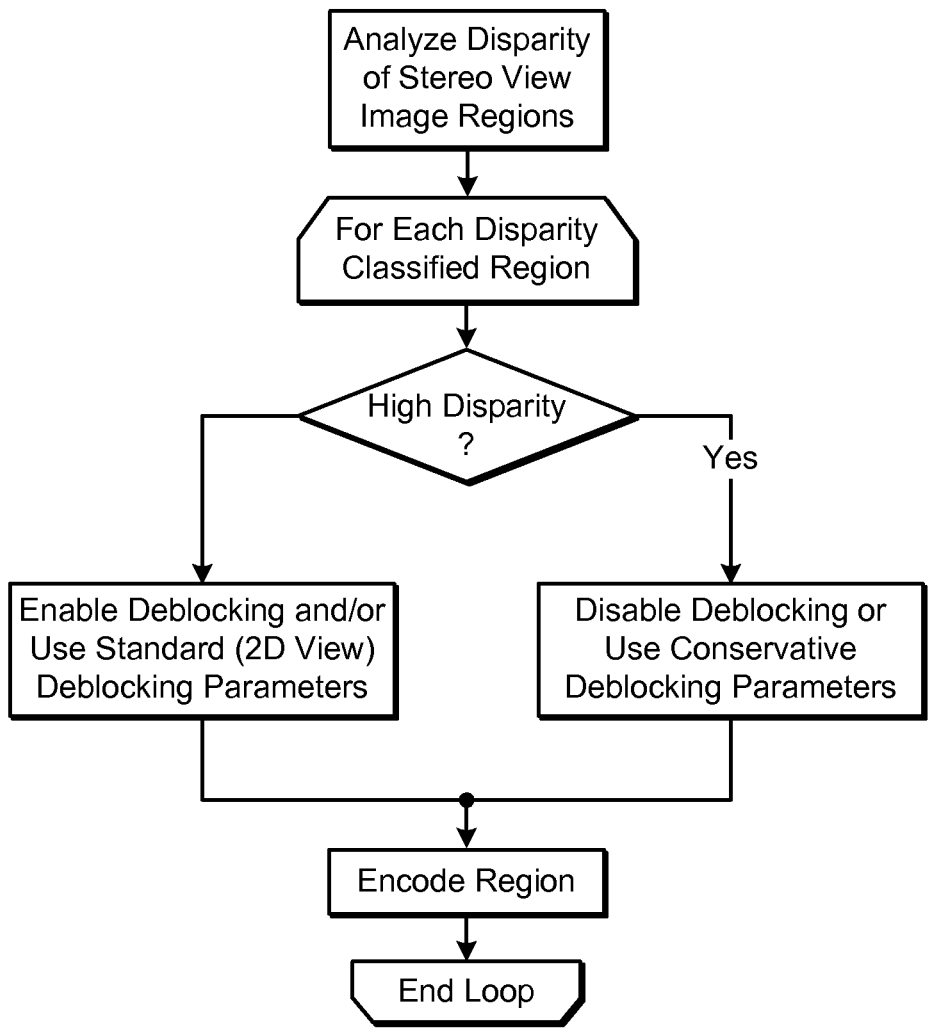
FIG. 11 is a flow chart illustrating de-blocking parameter determination according to an embodiment of the present invention.

Methods of the present invention are based primarily on the principle that all available encoding tools should be considered in a way that evaluates any possible contamination of the samples of one view from those of another. De-blocking in particular, usually performs a filtering process across adjacent samples, which, given certain stereoscopic arrangements such as the field and checkerboard interleaved methods, could considerably impair the stereo experience. It is therefore proposed that de-blocking is disabled or appropriately controlled for such material or for regions with significant stereo view disparity. For example, FIG. 11 is a flow chart illustrating a de-blocking parameter determination. The parameter is determined based on, for example, a given disparity classification process.

Figure 7:
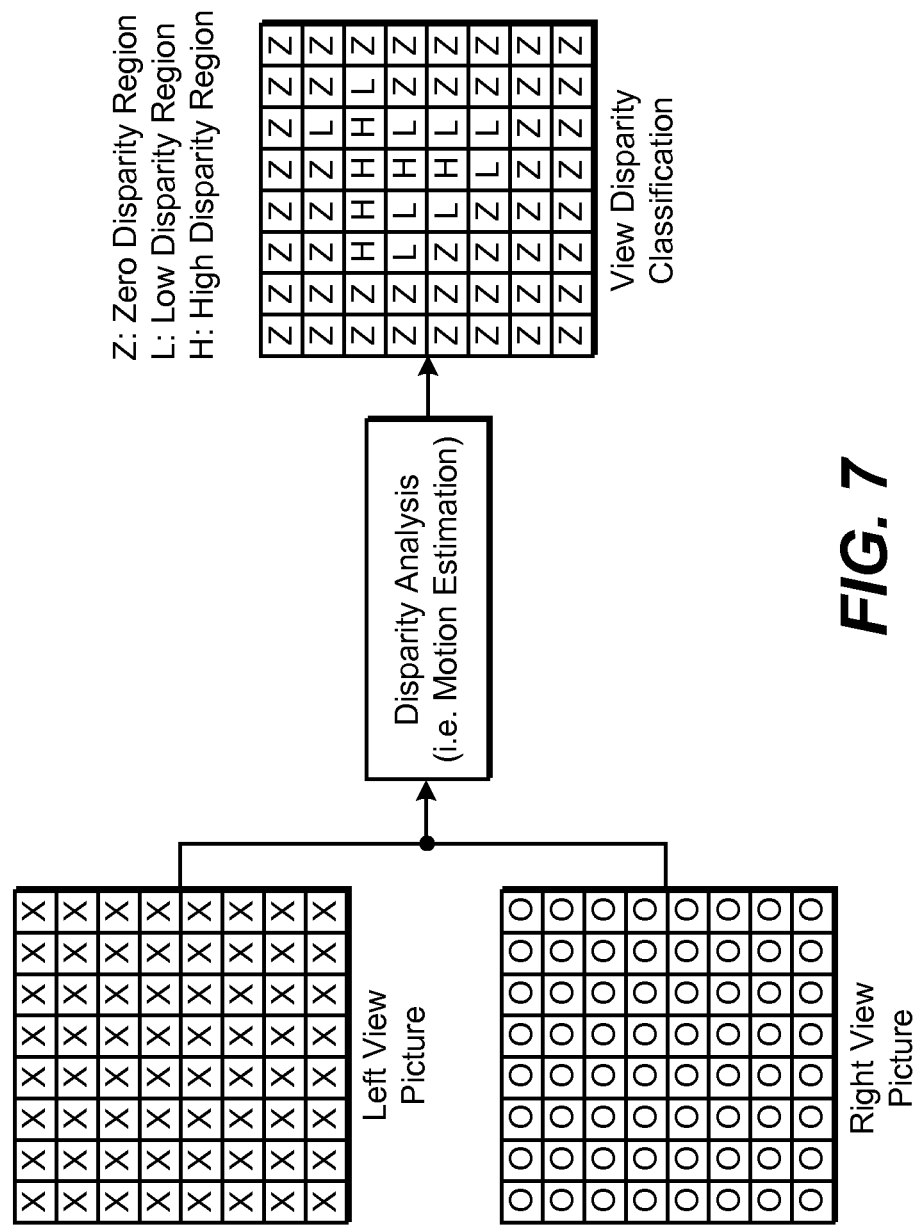
FIG. 7 is a diagram illustrating view disparity analysis and classification using Motion Estimation according to an embodiment of the present invention.

Determination of the extent of stereo view disparity may be performed, for example, by using a basic motion estimation test between the two views. The test could be performed using a block based motion estimation scheme, which may also include illumination change characterization, such as the Enhanced Predictive Zonal Search (EPZS) process, or other methods including pixel-recursive, phase based, and true-motion region based motion estimation among others (For example, FIG. 7 is a diagram illustrating view disparity analysis and classification using Motion Estimation according to an embodiment of the present invention). Using such processes, regions determined of having zero or near zero motion could be categorized as zero stereo view disparity or low stereo view disparity regions, while all others are categorized as high stereo view disparity regions.

Figure 8:
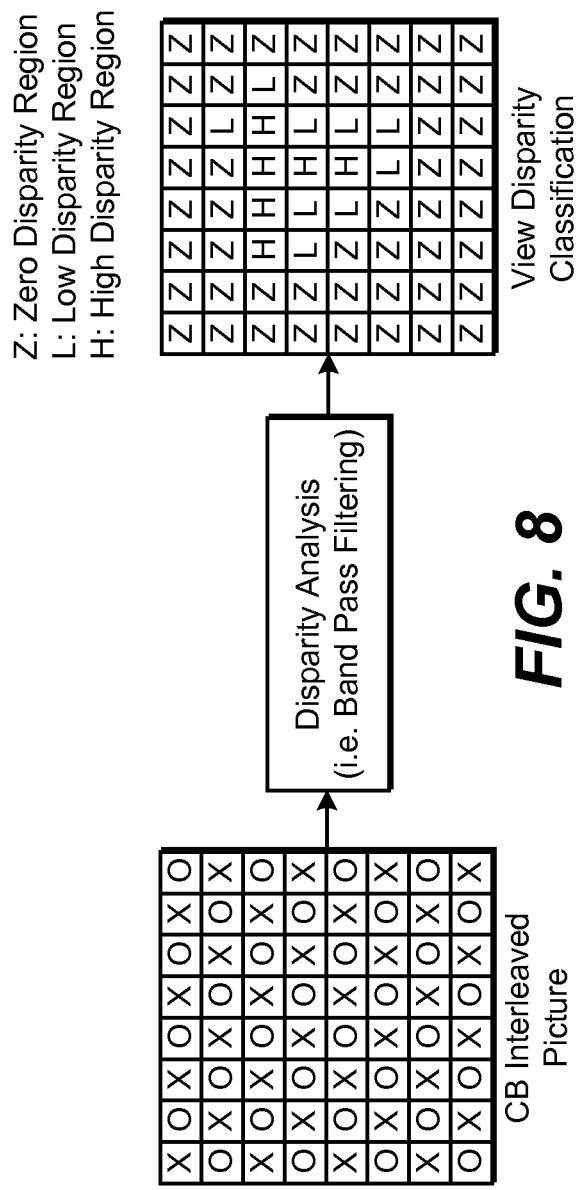
FIG. 8 is a diagram illustrating a view disparity analysis and classification of CB interleaved pictures using band pass filtering according to an embodiment of the present invention.

In one embodiment, de-blocking could be permitted and appropriately adjusted only on zero or low disparity regions, and disallowed or appropriately adjusted with a lower strength de-blocking mechanism on regions with high disparity. This could be done for example using appropriately arranged slices within the image and associating each one with the necessary de-blocking signals. Regions could also be characterized using other mechanisms such as the use of band pass filters such as the one presented in M. Latzel, J. K. Tsotsos, "*A robust motion detection and estimation filter for video signals,*" in Proceedings of the 2001 IEEE International Conference on Image Processing (ICIP '01), vol. 1, pp. 381-384, October '01, and extended in P. Yin, A. M. Tourapis, J. Boyce, "*Fast decision on picture adaptive frame/field coding for H.264,*" VCIP 2005. Instead of, however, applying such filters only vertically, given the stereo view arrangement, the same filter could be applied both vertically and horizontally and then determining if a region could be classified as a high, low, or zero disparity region. For example, FIG. 8 is a diagram illustrating a view disparity analysis and classification of CB interleaved pictures using band pass filtering according to an embodiment of the present invention.

Figure 9:
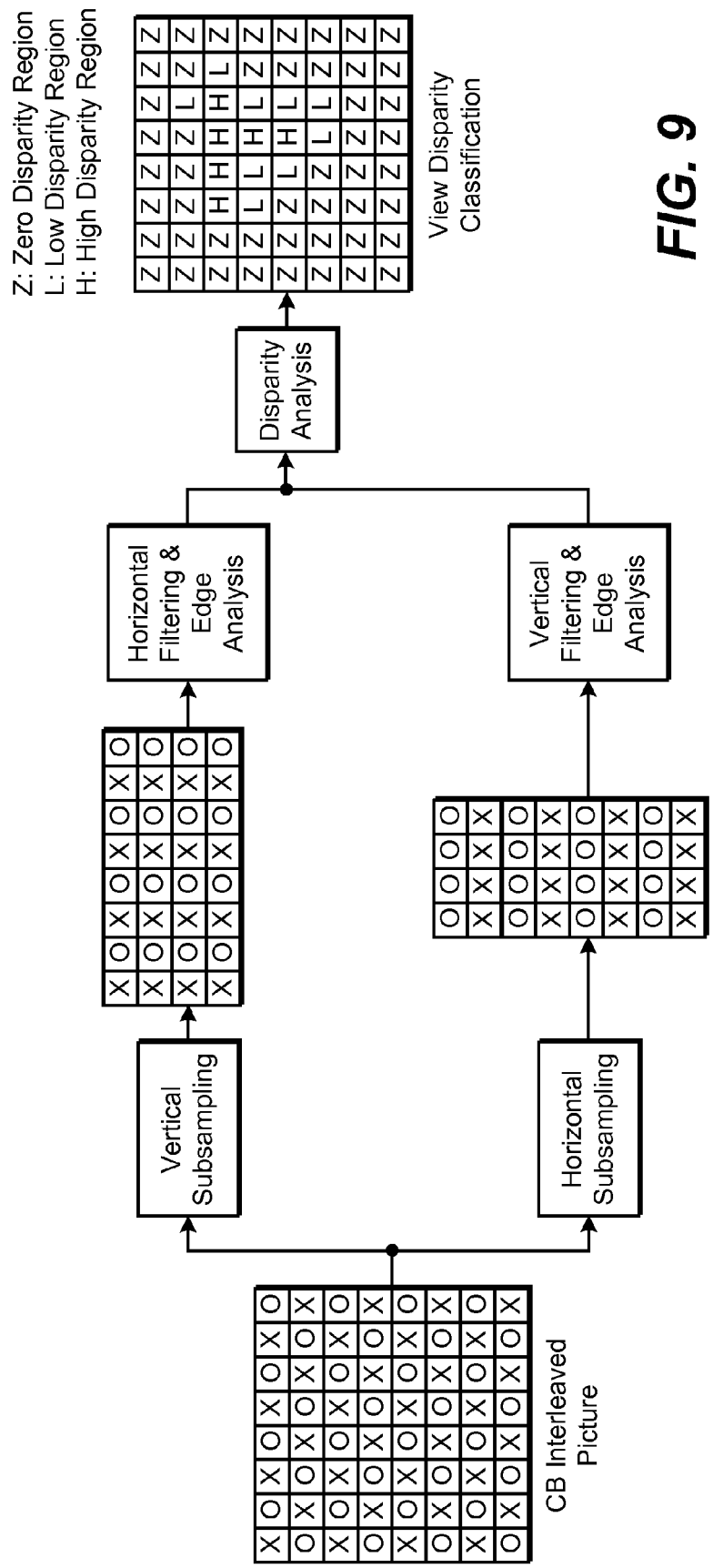
FIG. 9 is a diagram illustrating a view disparity analysis and classification using band pass filtering according to an embodiment of the present invention.

In one embodiment this is done by extending these methods to support 2D filters. These filters could also be applied by sub-sampling the image either horizontally and/or vertically, and by applying the appropriate filters given the orientation of the sub-sampling process. For example, we may create two sub-sampled versions of the original stereo multiplexed image, the first using horizontal sub-sampling, and the second using vertical sub-sampling. The first version is then processed using vertical band pass filtering, while the second one is processed using horizontal band pass filtering. Samples in both images are then characterized given the behavior of these filters and their results are accumulated to categorize the entire image. For example, FIG. 9 is a diagram illustrating an example view disparity analysis and classification of CB interleaved pictures using two stage band pass filtering according to an embodiment of the present invention.

Figure 10:
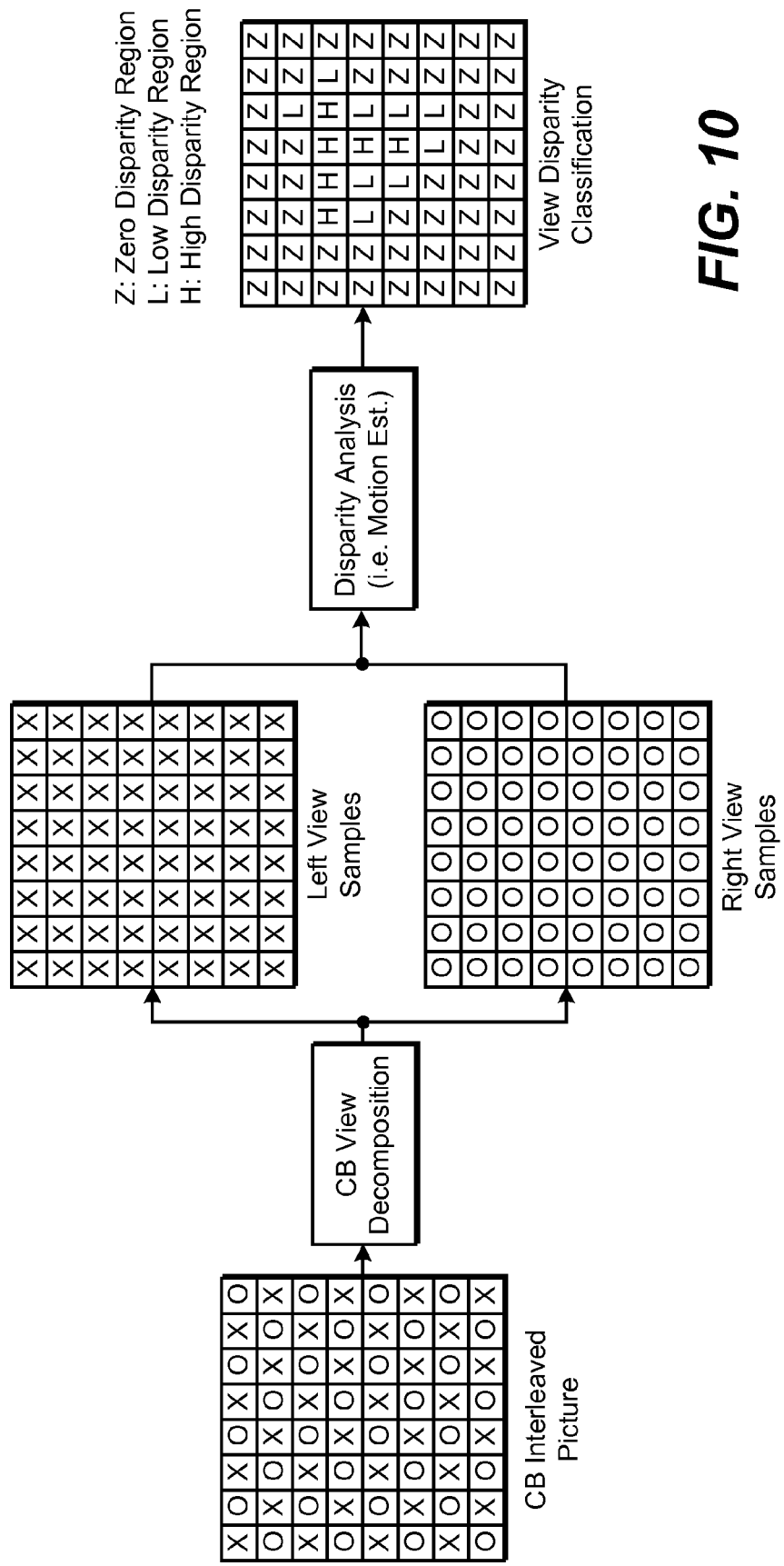
FIG. 10 is a diagram illustrating an example view disparity analysis and classification of CB interleaved pictures using Motion Estimation according to an embodiment of the present invention.

Other methods for categorizing disparity such as that described in Adams, "Interlace motion artifact detection using vertical frequency detection and analysis," U.S. Pat. No. 6,909,469, the contents of which are incorporated herein by reference in their entirety, could also be used. It should be noted that motion based analysis could be used even for already interleaved picture arrangements by either performing the analysis through decomposing and reconstructing the final, full resolution views, or by creating sub-images of lower resolution that contain samples from only one view each and performing motion estimation and characterization on these sub-images. For example, FIG. 10 is a diagram illustrating an example view disparity analysis and classification of CB interleaved pictures using Motion Estimation according to an embodiment of the present invention. A corresponding process employs a view decomposition stage which may involve, for example, filtering or the consideration of only aligned samples (i.e. samples only from even or odd lines in the image).

It should be noted that the above disparity analysis is not only useful for the selection of the de-blocking mechanism that is to be applied to each region of an image, but also for other purposes such as the determination of which coding tools, such as motion estimation, should be considered for encoding a region, which may considerably help in reducing encoding complexity.

In one embodiment, an encoder first performs disparity analysis of an image. If a region is classified as a high stereo view disparity region, tools that may result in contamination of samples of one view with those of another are disabled or reduced in consideration priority during the encoding decision process. For example, it is observed that sub-sample motion compensation in existing codecs is performed using a variety of filters that are applied across the image. In particular, in AVC/H.264 a 6-tap filter is employed for half sample positions, and bilinear filtering is employed for quarter-sample and chroma sub-sample positions. Other filters, including bicubic, 2D non-separable, diagonal, and others may also be used.

Figure 12:
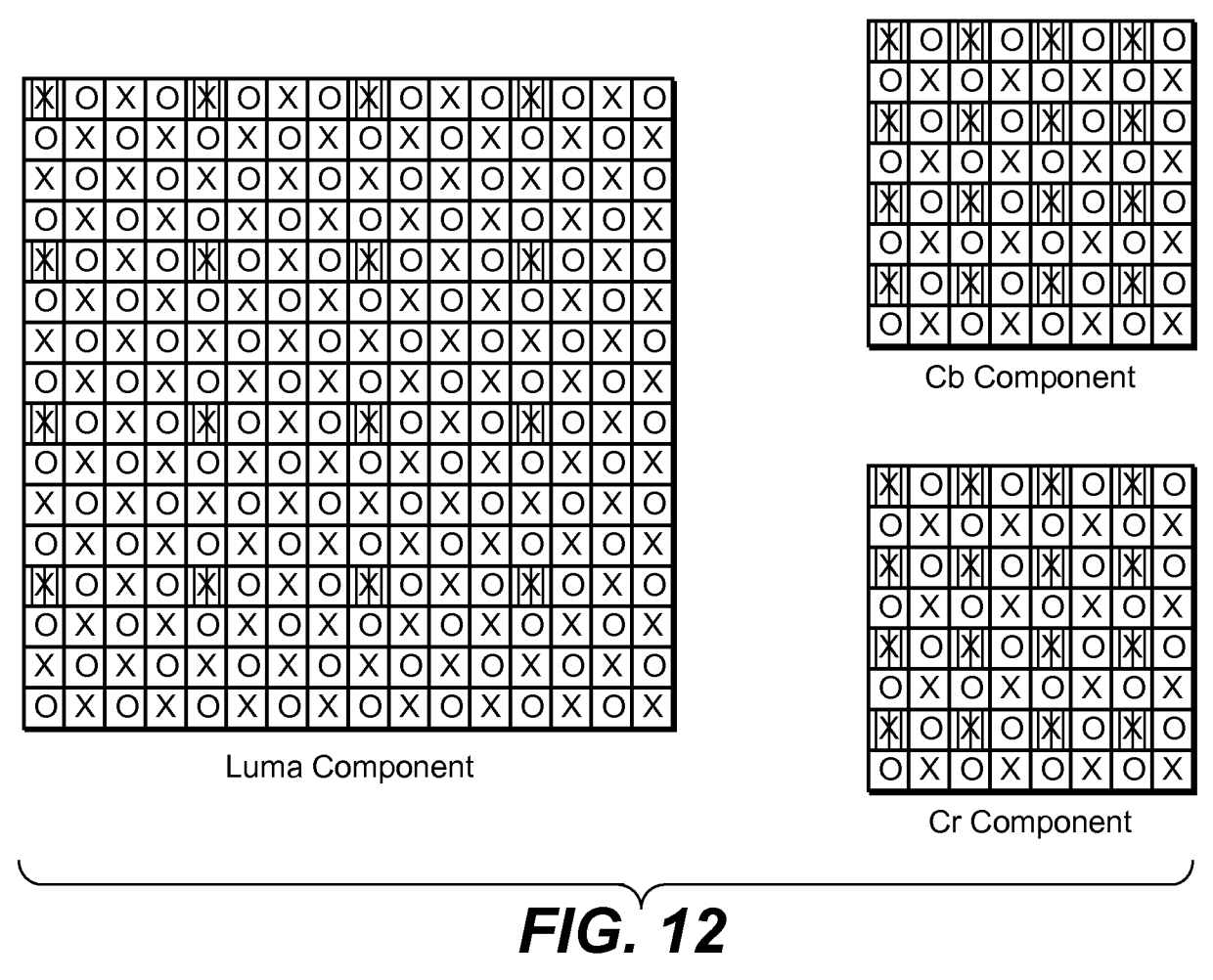

For high stereo view disparity regions the likelihood of sub-sample interpolation is considerably lower, and in fact, if used, may result in considerable coding artifacts that the residual coding process may need to correct. Therefore, the encoder may determine that it is unnecessary to consider such tools for these regions, considerably reducing complexity and the possibility of incurring coding artifacts. Similar conclusions could also be made for the consideration of certain integer sample positions within the image. In particular, it is observed that 4:2:0 content, and the CB interleaving pattern, only modulo 4 integer sample positions compared to the current position avoid any contamination from a different view. For example, see FIG. 12 which is a diagram illustrating 4:2:0 content according to an embodiment of the present invention. The diagram illustrates that modulo 4 integer samples have no cross view contamination for motion estimation and compensation purposes. Limiting motion estimation to those positions can have considerable impact on both coding performance and complexity.

In particular positions of distance 1 horizontally or vertically result in obvious prediction contamination of the luma component, but also partial contamination of the chroma component (because of the use of bilinear filtering for chroma). Similarly for positions of distance 2 horizontally or vertically, even though luma sample prediction is properly performed, are still affected by improper prediction of chroma samples.

In one embodiment, and similar to the sub-sample case, an encoder does not consider or reduces the consideration priority (i.e., within a fast motion estimation scheme such as EPZS) samples that may result in cross view contamination during the encoding process. Consideration priority could be designed in a way such that we first consider module 4 integer positions. If the best position using these samples does not satisfy a certain thresholding criterion, e.g. distortion such as SAD is not below a certain value T1 then all other positions are also examined. The remaining positions could also be examined in stages based on stereo view sample contamination impact, i.e. first examine modulo 2 distance positions (quality impact from chroma contamination only), followed by odd distance positions (contamination from both luma and chroma samples).

In one embodiment, this consideration could be applied only at a pre-analysis/first encoding pass stage, i.e., when pre-analysis statistics are required for the determination of encoding parameters, such as quantization parameters, in a multi-pass encoding scheme. In a different embodiment, this approach is only considered for certain reference pictures or block sizes of a certain size (i.e., for AVC/H.264 only for block sizes 8×8 and below) and not for larger partitions for which all samples are examined.

The approach can also be extended for stereo view multiplexing schemes that consider alternating subsampling for every picture. It should be obvious to anyone familiar with the art that this approach could be easily extended to other color and/or chroma subsampling formats. Furthermore, the above discussions can also be extended to intra prediction.

Field based coding, even if the stereo view samples are not arranged in a row interleaved (field sequential) approach, could still be useful for encoding purposes and could provide additional benefits. In particular, for the checkerboard interleaving approach, field coding, both at the picture and macroblock level, would result in images which full vertical stereo view correspondence which may improve compression efficiency. This would also improve the reliability of vertical interpolation, which, given the previous discussions, can now be more useful and more reliable for motion and intra prediction (i.e. improved performance of vertical intra prediction). Impact on stereo view quality can also be considered during the design and selection of quantization matrices for both frame and field coding arrangements.

Figure 13:
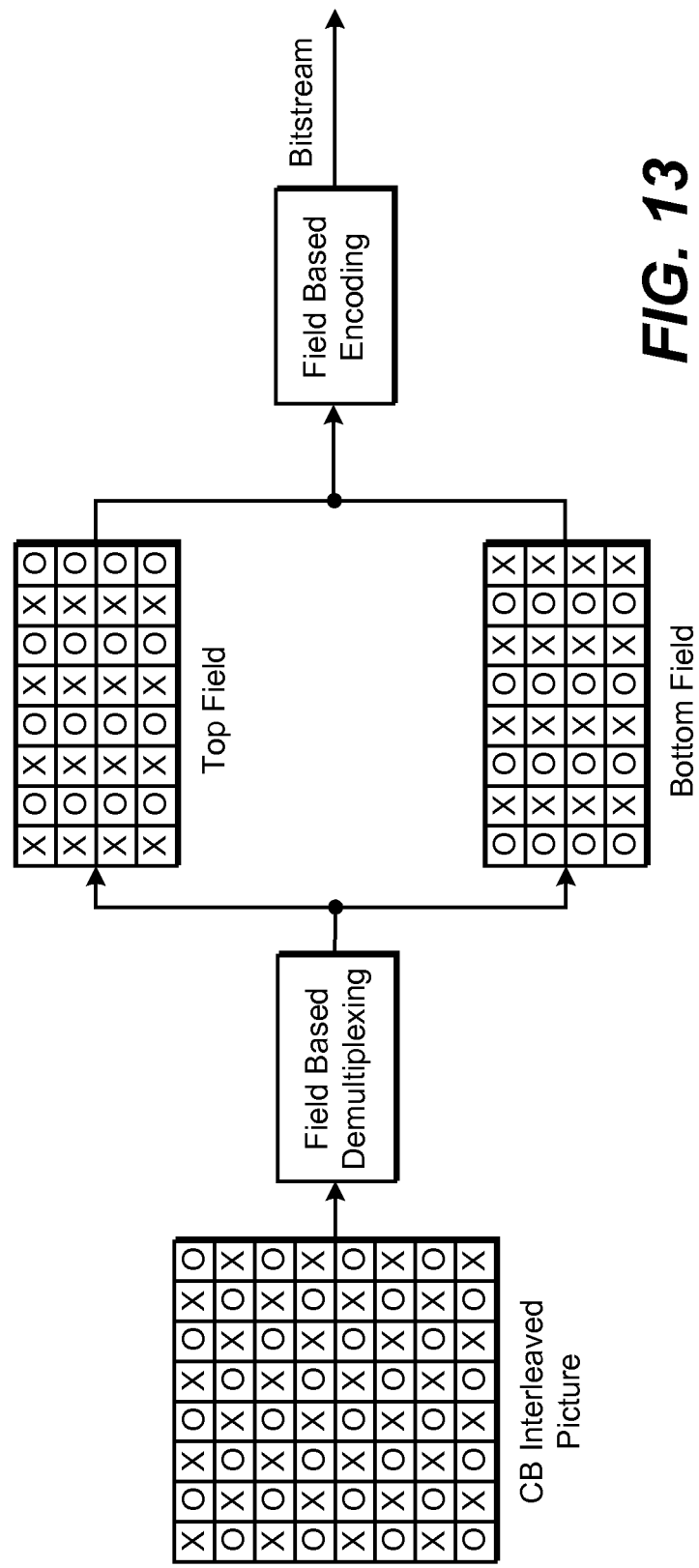
FIG. 13 is diagram illustrating a field based encoding according to an embodiment of the present invention.

FIG. 13 is diagram illustrating a field based encoding according to an embodiment of the present invention. The field based coding is both at the picture and macroblock level and is useful for various types of stereo view mixing such as checkerboard interleaving. In the illustrated example arrangement only horizontal sample contamination exists potentially improving coding efficiency.

In one embodiment, coding performance can be considerably improved by performing encoding decisions by considering the final output format, i.e. final stereo view image including any appropriate interpolation, for evaluating the distortion of a given decision. Decisions could include picture and macroblock level decisions such as the selection of a certain block coding mode, reference, motion vector and/or illumination change parameters, intra prediction mode among others. Distortion, such as the sum of absolute differences (SAD) or sum of square errors (SSE), can be computed compared to either the original non interleaved stereo views, or the reconstructed stereo views using the original, non-encoded stereo interleaved images. For, each coding mode, distortion is evaluated by considering the prediction (for low complexity or basic motion estimation) or the final reconstructed (for high complexity) samples and de-multiplexing and appropriately interpolating the views.

Figure 14:
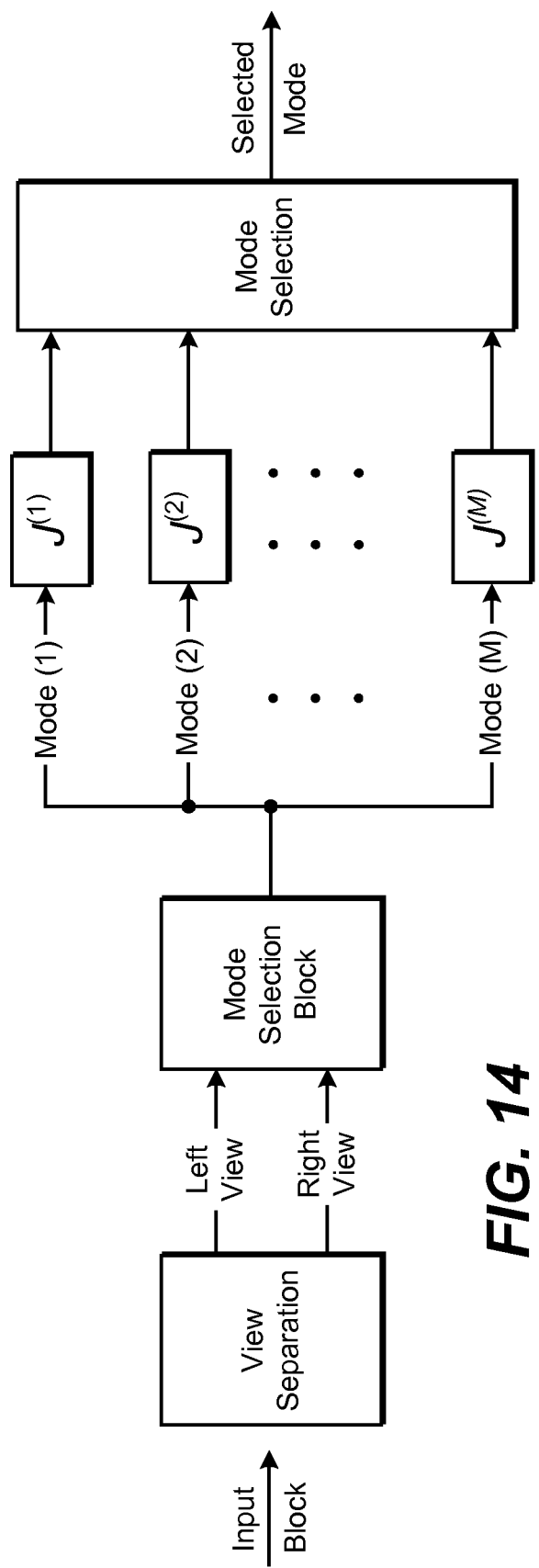
FIG. 14 is a block diagram illustrating a coding mode decision according to an embodiment of the present invention.

Interpolation could be using basic interpolation processes (i.e. averaging of all adjacent same view samples), or could be done using more complex processes that emulate the processing performed prior and/or during display (e.g., see FIG. 14 which is a block diagram illustrating a coding mode decision according to an embodiment of the present invention. The coding performance of a mode decision and/or motion estimation can be improved if distortion is computed by separating stereo view samples and computing distortion given the 3D viewing experience) In particular, assuming the usage of lagrangian optimization, video coding decisions can be performed using the lagrangian cost of the form:

$$J(\lambda) = \mu_{LV} D_{LV}(R) + \mu_{RV} D_{RV}(R) + \lambda \cdot R \quad (1)$$

where DLV and DRV are the distortion values for the left and right view respectively, $\mu_{LV}$ and $\mu_{RV}$ are the lagrangian multipliers associated with each view, R is an estimate or the actual bit-rate for selecting that coding mode.

Finally, $\lambda$ is the lagrangian parameter for the rate parameter. In one embodiment $\mu_{LV} > \mu_{RV}$, giving higher bias towards the quality of one view (i.e., left) compared to the other (i.e., right) which can help exploit stereo view masking characteristics. This method may also be done while considering the disparity region analysis method described earlier. In particular, for example, for zero or low stereo disparity regions we can jointly consider distortion of all views without having to perform any additional processing, and only consider this method for high stereo disparity regions therefore reducing complexity considerably.

Figure 5:
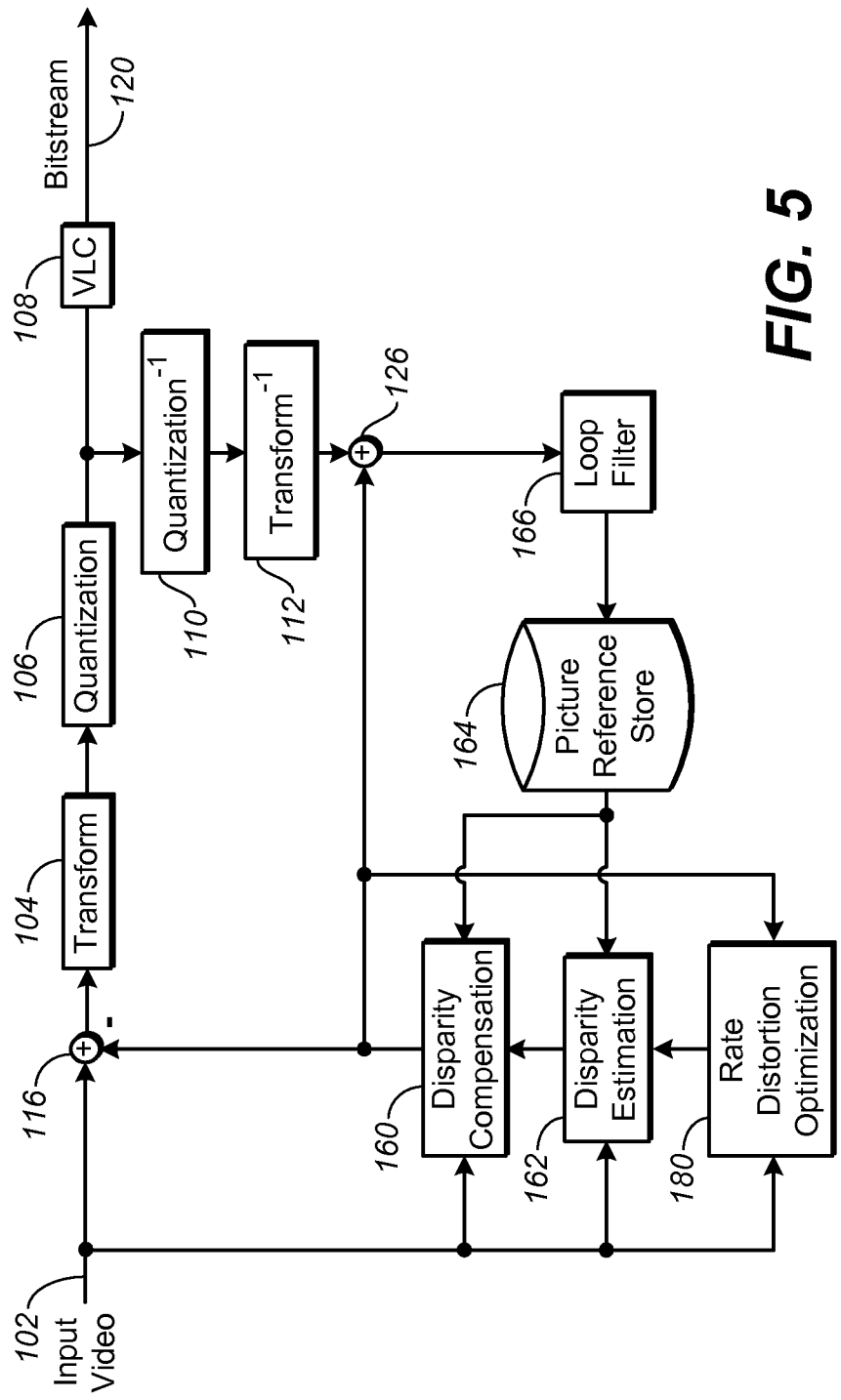
FIG. 5 is a diagram of a video encoder (i.e. AVC encoder) configured according to embodiments of the present invention.

Based on the present disclosure, various devices of varying capability and efficiency may be constructed. An exemplary such device is illustrated, for example, in FIG. 5. FIG. 5 is a diagram of a video encoder (i.e. AVC encoder) configured according to embodiments of the present invention, and includes, for example, facilities for determination of one or more, or any of the above disparity determinations, and facilities to adjust, control, or turn off any one or more of various described encoding features (or encoding features to be developed in the future).

Figure 6:
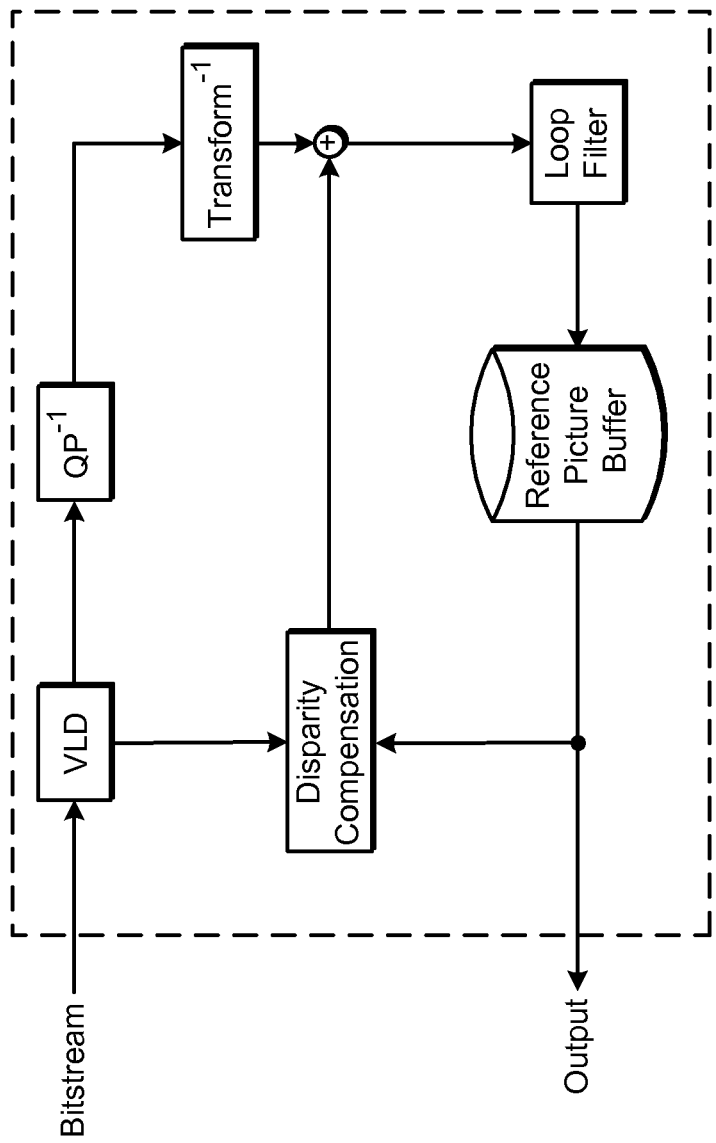
FIG. 6 is a diagram of a video decoder (i.e. AVC decoder) capable of decoding optimized coded images/video according to an embodiment of the present invention.

FIG. 6 is a diagram of a video decoder (i.e. AVC decoder) capable of decoding optimized coded images/video according to an embodiment of the present invention. The decoder is generic, but is fed a signal or otherwise accesses data via a bitstream that is encoded according to the present invention. The present invention specifically includes any decoder, either specialized or generic that is fed or is intended to access data (whether transmitted in a bitstream or read from a memory storage (e.g., memory stick, hard drive, I-pod, etc) encoded according to any aspect, feature, device, or process according to the present invention.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to encoders, decoders, comparitors, multiplexors, processes, processors, arrangements of hardware, including Blu-ray players, patterns, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/-, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparing a checkerboard of pixels from more than one image, encoding a checkerboard as a frame of a video format, encoding a checkerboard as a frame of a video format and controlling at least one encoding feature for regions of an image pattern in the checkerboard representing more than one image where the regions include an amount of disparity in the represented images that would result in cross-contamination between the represented images if encoded without controlling the feature, packaging a checkerboard encoded set of images into a transport format, decoding a transport format containing a checkerboard encoded set of images, decoding a video format including a patterned set of images in at least one frame, decoding a video format including a checkerboard pattern of data for images, decoding a video format including a checkerboard pattern of image data representing $1^{st}$ and $2^{nd}$ channel image data of a 3D image, recognizing a patterned set of images in at least one frame images in at least one frame, and the display, storage, or communication of results according to the processes of the present invention.

Thus, embodiments of the present invention may relate to one or more of the Enumerated Example Embodiments (EEEs) below, each of which are examples, and, as with any other related discussion provided above, should not be construed as limiting any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.).

EXAMPLES

Enumerated Example Embodiment 1 (EEE1). A method of encoding images comprising the step of controlling an encoding feature of an encoding process for regions of an image pattern representing more than one image to be encoded by the encoding process when the regions include an amount of disparity in the represented images that would result in cross-contamination between the represented images if encoded with the feature.

EEE2. The method according to EEE1, wherein the step of controlling an encoding feature comprises turning the encoding feature off.

EEE3. The method according to EEE1, wherein the step of controlling an encoding feature comprises using the encoding feature less often than when encoding an image pattern representing a single image.

EEE4. The method according to EEE1, wherein the step of controlling an encoding feature comprises negatively biasing the encoding feature.

EEE5. The method according to EEE1, wherein the represented images comprise one of a stereoscopic view, multiple stereoscopic views, multiple views of a same scene, and multiple unrelated views.

EEE6. The method according to EEE1, wherein the step of controlling comprises a relative degree of change in the encoding feature and the relative degree of change is based on the disparity.

EEE7. The method according to EEE1, wherein the step of controlling comprises at least partially enabling the encoding feature for regions determined to have zero or near zero disparity and disabling the feature for all other regions.

EEE8. The method according to EEE1, further comprising the step of determining the disparity by bandpass filtering the images.

EEE9. The method according to EEE8, wherein the bandpass filtering is applied both vertically and horizontally.

EEE10. The method according to EEE1, further comprising the step of classifying the disparity of a region as being one of high disparity, low disparity, and zero disparity, and using the disparity classification to direct the step of controlling.

EEE11. The method according to EEE1, wherein the amount of disparity comprises an amount of disparity between neighboring regions in the represented images.

EEE12. The method according to EEE1, wherein the amount of disparity comprises an amount of disparity between corresponding regions in the represented images.

EEE13. The method according to EEE12, wherein the amount of disparity comprises an amount of stereoscopic disparity.

EEE14. The method according to EEE13, wherein the step of controlling comprises enabling the encoding feature for a region having relatively low or no stereoscopic disparity when compared to a corresponding region of another image in the pattern, and disabling the encoding feature for a region having relatively higher stereoscopic disparity.

EEE15. The method according to EEE1, wherein the disparity comprise differences in a location of the regions.

EEE16. The method according to EEE15, wherein the step of controlling comprises enabling the encoding feature for regions in background locations and disabling the encoding feature for regions in foreground locations.

EEE17. The method according to EEE1, wherein the amount of disparity comprises an amount of estimated motion in corresponding regions of the more than one image.

EEE18. The method according to EEE17, wherein the estimated motion comprises a feature based motion estimation.

EEE19. The method according to EEE17, wherein the estimated motion comprises a pixel based motion estimation.

EEE20. The method according to EEE17, wherein the estimated motion comprises at least one of a block based, phase based, frequency domain, pixel recursive, true motion region, and Bayesian based motion estimations.

EEE21. The method according to EEE17, wherein the estimated motion comprises the Enhanced Predictive Zonal Search (EPZS).

EEE22. The method according to EEE17, wherein the step of controlling comprises at least partially enabling the feature for regions determined to have zero or near zero motion and disabling the feature for all other regions.

EEE23. The method according to EEE17, wherein the amount of disparity comprises an amount of illumination change in the corresponding regions.

EEE24. The method according to EEE23, wherein the corresponding regions comprise corresponding regions in a stereoscopic pair of images.

EEE25. The method according to EEE1, wherein the amount of disparity comprises an amount of motion estimation between the images.

EEE26. The method according to EEE25, wherein the motion estimation is determined via a search comprising an Enhanced Predictive Zonal Search (EPZS).

EEE27. The method according to EEE1, wherein the encoding feature comprises one of de-blocking, transform, and quantization.

EEE28. The method according to EEE1, wherein the encoding feature comprises motion compensation.

EEE29. The method according to EEE1, wherein the encoding feature comprises at least one of inter-frame and intra-frame prediction.

EEE30. The method according to EEE1, wherein the encoding feature comprises a transform.

EEE31. The method according to EEE30, wherein the encoding feature further comprises quantization.

EEE32. The method according to EEE1, wherein the encoding feature comprises at least one of a color format and sampling configuration.

EEE33. The method according to EEE1, wherein the encoding process comprises a video encoding process.

EEE34. The method according to EEE33, wherein the video encoding process comprises High Definition video encoding.

EEE35. The method according to EEE1, wherein the encoding process comprises scalable video coding.

EEE36. The method according to EEE35, wherein the scalable video coding comprises the scalable video coding extension of the AVC/H.264 standard EEE37. The method according to EEE1, wherein the encoding process comprises video.

EEE38. The method according to EEE1, wherein the encoding process comprises any of any of MPEG codecs, including MPEG-1, MPEG-2, MPEG-4 Part 2 and MPEG-4 AVC/H.264, or other codecs such as VC1, RealVideo, On2 VP6/VP7, or other coding techniques including the Multi-view Video Coding extension of AVC.

EEE39. The method according to EEE1, wherein the image pattern comprises a "black" and "white" checkerboard arrangement of pixels where the "black" pixels comprise pixels of an image of a first channel in a stereoscopic view and the "white" pixels comprise pixels of a second channel in the stereoscopic view.

EEE40. The method according to EEE1, wherein the image pattern comprises a "multi-colored" "checkerboard" arrangement of pixels where each individual "color" of the "checkerboard" comprises pixels of an individual one of the more than one images.

EEE41. The method according to EEE40, wherein the "multi-colored" "checkerboard" comprises more than two "colors."

EEE42. The method according to EEE1, wherein the image pattern comprises a "multi-colored" arrangement of pixels where each individual "color" of the arrangement comprises pixels of an individual one of the more than one images.

EEE43. The method according to EEE42, wherein the arrangement comprises an arrangement of at least one of rows and columns allocated to each "color"/image.

EEE44. The method according to EEE42, wherein the arrangement comprises a modulo-spacing arrangement of locations in the arrangement allocated to each "color"/image.

EEE45. The method according to EEE1, wherein the encoding process comprises field based encoding.

EEE46. The method according to EEE1, wherein the encoding process comprises field based encoding performed in at least one of a picture level and a macroblock level.

EEE47. The method according to EEE1, wherein the amount of disparity is computed via a process comprising at least one of a picture level analysis, analysis of a slice, a region level analysis, a macro-block, and block level analysis.

EEE48. The method according to EEE1, wherein the amount of disparity is determined in a step comprising computing distortion.

EEE49. The method according to EEE48, wherein the step of computing distortion comprises separating stereo view samples and computing distortion based on a 3D view of the separated samples.

EEE50. The method according to EEE48, wherein the computed distortion comprises at least one of luma and chroma.

EEE51. The method according to EEE48, wherein the computed distortion comprises a comparison to at least one of the images prior to being represented in the image pattern.

EEE52. The method according to EEE40, wherein the amount of disparity is determined in a step comprising computing distortion computed by comparing the original images to images represented in the "checkerboard" after being decoded.

EEE53. The method according to EEE1, wherein the amount of disparity is determined in a step comprising computing distortion wherein the distortion is computed by comparing original pre-image pattern images to the images represented in the image pattern after being decoded.

EEE54. The method according to EEE1, wherein the amount of disparity is determined in a step comprising computing distortion wherein the distortion is computed from an original pair of 3D images that are subsequently encoded into the image pattern and then comparing the original pair of images to the images decoded from the image pattern.

EEE55. The method according to EEE1, further comprising the step of reducing quality of at least a region of at least one image set of the represented images.

EEE56. The method according to EEE55, wherein the step of reducing quality is performed based on a content of the image set being reduced.

EEE57. The method according to EEE55, wherein the step of reducing quality is performed based on a pricing model that takes into account a desired and acceptable level of quality of the image sets.

EEE58. The method according to EEE55, wherein the image sets within the represented images are prioritized based on a desired quality, and the step of reducing quality, if performed on an image set, is regulated according to the image set priority such that a lower priority image set is reduced in quality further than a higher priority image set.

EEE59. The method according to EEE55, wherein the image sets within the represented images are prioritized based on a desired quality, and the step of reducing quality, if performed on an image set, is regulated according to the image set priority and size of the image set such that a lower priority image set is reduced in quality further than a higher priority image set unless a higher priority image set is too large and additional space or bandwidth is needed to carry all of the image sets.

EEE60. The method according to EEE55, wherein the step of reducing quality is performed on a view of a stereoscopic image set.

EEE61. A method comprising the steps of:
receiving a stereoscopic pair of images;
combining the images into an image pattern;
evaluating at least one tool for encoding the image pattern; and
applying at least one of the encoding tools in an encoding process if an amount of cross-contamination between the images in either the encoding or corresponding decoding processes is below a predetermined cross-contamination threshold;
wherein the encoding process comprises an existing video format.

EEE62. The method according to EEE61, wherein the step of applying at least one of the encoding tools comprises prioritizing regions of the images and applying the encoding tools to each region according to the priority.

EEE63. The method according to EEE62, wherein the prioritization comprises high priority regions where at least one encoding tool is applied and low priority regions where the coding tools are not necessarily applied.

EEE64. The method according to EEE62, wherein the prioritization is based on a region passing at least one predetermined threshold.

EEE65. The method according to EEE64, wherein the at least one predetermined threshold comprises at least on of a stereo disparity, motion detection, luminance difference, and chrominance difference thresholds.

EEE66. The method according to EEE61, wherein the existing video format comprises a video format not developed for encoding stereoscopic images.

EEE67. The method according to EEE61, wherein the existing video format comprises a scalable video coding extension.

EEE68. The method according to EEE61, wherein the step of evaluating comprises at least one of stereo disparity analysis, motion estimation analysis, luminosity analysis, analysis from multi-pass encoding, analysis from pre-processing and earlier passes, and Motion Compensation Temporal Filtering (MCTF) analysis.

EEE69. The method according to EEE61, wherein at least one tool comprises at least one of a de-blocking tool and a prediction tool.

EEE70. The method according to EEE61, further comprising the step of applying at least one of the encoding tools, comprises applying at least one of the encoding tools at a reduced level if the amount of cross-contamination is within an acceptable pre-determined cross-contamination range.

EEE71. The method according to EEE61, wherein the cross-contamination comprises at least one of luma, chroma, blocking, and stereo view contamination.

EEE72. The method according to EEE61, wherein the step of evaluating comprises a cost process.

EEE73. The method according to EEE72, wherein the cost process comprises a function of computational costs and contamination costs.

EEE74. The method according to EEE72, wherein the cost process comprises a lagrangian cost comprising $$J(\lambda) = \mu_{LV} D_{LV}(R) + \mu_{RV} D_{RV}(R) + \lambda \cdot R,$$

where
$D_{LV}$ and $D_{RV}$ are distortion values for left and right images of the image pair,
$\mu_{LV}$ and $\mu_{RV}$ are lagrangian multipliers associated with each image,
R is an estimate or an actual bit-rate for selecting a coding mode comprising the encoding tools, and
$\lambda$ is a lagrangian parameter for the rate parameter.

EEE75. The method according to EEE74, further comprising the step of exploiting Stereo View Masking (SVM) by applying at least one of the encoding tools in an encoding process in cases where $\mu_{LV} > \mu_{RV}$, or $\mu_{LV} < \mu_{RV}$ resulting in a higher bias towards the quality of one view.

EEE76. The method according to EEE61, further comprising the step of exploiting stereo view masking (SVM) by providing a lower quality version of one of the stereoscopic pair of images and alternating the lower quality version between subsequent left and right views of the stereoscopic pair of images.

EEE77. The method according to EEE61, further comprising the step of exploiting stereo view masking (SVM) by providing a varying quality of at least one of the stereoscopic pair of images wherein the quality is selected based on a priority of the image.

EEE78. The method according to EEE61, further comprising the step of exploiting Stereo View Masking (SVM) by applying at least one of the encoding tools in an encoding process if an amount of cross-contamination in one of the images in either the encoding or corresponding decoding processes is above a first predetermined SVM cross-contamination threshold and an amount of cross-contamination in the other image in either the encoding or corresponding decoding processes is below a second predetermined SVM cross-contamination threshold.

EEE79. An encoding device, comprising:
an input port configured to receive a bit pattern comprising image data to be encoded;
an encoder comprising a set of tools configured to encode aspects of the image data to be encoded;
an evaluation processor configured to,
evaluate at least one factor between corresponding regions of a set of images embedded in the bit pattern of the image to be decoded, and
regulate an amount of use of at least one of the tools based on said evaluation.

EEE80. The encoding device according to EEE79, wherein said factor comprises at least one of disparity, luminance, chrominance, and motion estimation.

EEE81. The encoding device according to EEE79, wherein the set of tools comprises at least one of a de-blocking tool and a motion prediction tool.

EEE82. The encoding device according to EEE79, wherein the encoder comprises a scalable video encoder.

EEE83. The encoding device according to EEE82, wherein the scalable video encoder comprises an extension of an existing video format.

EEE84. The encoding device according to EEE83, wherein the video format comprises AVC/H.264.

EEE85. The encoding device according to EEE83, wherein the video format comprises one of AVS and VC1.

EEE86. The encoding device according to EEE79, wherein the regulation by the evaluation processor comprises negatively biasing at least one of the tools if at least one of the evaluated factors exceeds a pre-determined threshold.

EEE87. The encoding device according to EEE79, wherein the regulation by the evaluation processor comprises negatively biasing at least one of the tools by an amount that varies depending on a priority level associated with the evaluated factors.

EEE88. The encoding device according to EEE79, wherein the regulation by the evaluation processor comprises reducing an effect of use of at least one of the tools if at least one of the evaluated factors exceeds a pre-determined threshold.

EEE89. The encoding device according to EEE79, wherein the set of images comprises one of a stereoscopic view, multiple stereoscopic views, multiple views of a same scene, and multiple unrelated views.

EEE90. An add-on device, comprising a decoded video input port, and a multi-view signal output port, wherein the add-on device is configured to processes a video received on the input port that comprises a decoded multi-view-in-each-frame video to produce a multi-view signal to be transmitted by the output port.

EEE91. The add-on device according to EEE90, wherein the decoded multi-view-in-each-frame video comprises a 3D video having left and right views embedded in each frame of the video.

EEE92. The add-on device according to EEE91, wherein at least one of the input port and the output port comprises a wireless port.

EEE93. The add-on device according to EEE90, wherein the decoded multi-view-in-each-frame video comprises a video that was decompressed from a checkerboard pattern.

EEE94. The add-on device according to EEE90, wherein the decoded multi-view-in-each-frame video comprises a video that was decompressed from a checkerboard pattern and was encoded in the checkerboard pattern via a method that included a step of controlling at least one encoding feature based on a disparity between at least two of the views of an original video from which that encoding was made.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be included in a subsequently filed utility patent application, the invention may be practiced otherwise than as specifically described herein.

What is claimed is:

1. A method of encoding images comprising:
receiving an image with an image pattern comprising a checkerboard arrangement of pixels from two channels of a stereoscopic view;
classifying the disparity of regions in the image as being one of high disparity, low disparity and zero disparity, wherein the disparity is determined by at least one of bandpass filtering the image patterns and computing distortion, wherein the distortion is computed by comparing original pre-image pattern images to the images represented in the image pattern after being decoded, wherein the amount of disparity comprises at least one of an amount of estimated motion in corresponding regions of the images, and an amount of illumination change in corresponding regions of the images;
turning off or negatively biasing an encoding feature of an encoding process for regions of an image pattern based on the disparity classification, when the regions include an amount of disparity in the represented images of the same frame such that the amount of disparity in the represented images would result in cross-contamination between the represented images if encoded with the encoding feature.

2. The method according to claim 1 wherein the method further comprises the step of evaluating at least one factor between corresponding regions of a set of images embedded in the bit pattern of the image to be decoded.

3. The method according to claim 2 wherein said factors comprise one of a group, said group comprising: disparity, luminance, chrominance and motion estimation.

4. The method according to claim 3 wherein the method further comprises the step of regulating the amount of use of a set of encoding features to be employed to encode said set of images depending upon the result of the evaluation.

5. The method according to claim 4 wherein the set of encoding features comprises one of group, said group comprising: a de-blocking tool, a transform tool, a quantization tool, a motion compensation tool, a color formatting tool, a sampling tool and a motion prediction tool.

6. The method according to claim 5 wherein the step of regulating the amount of use of a set of encoding features further comprises reducing an effect of at least one of the encoding features if at least one of the evaluated factors exceeds a pre-determined threshold.

7. The method according to claim 5 wherein the step of regulating the amount of use of a set of encoding features further comprises one of a group, said group comprising: turning off at least one encoding feature, using at least one encoding feature less often, negatively biasing at least one encoding feature, instituting a relative degree of change in at least one encoding feature where the relative degree of change is based on the disparity, partially enabling at least one encoding feature for regions determined to have zero or near zero disparity and disabling the feature for all other regions, enabling at least one encoding feature for a region having relatively low or no stereoscopic disparity when compared to a corresponding region of another image in the pattern, disabling at least one encoding feature for a region having relatively higher stereoscopic disparity, enabling at least one encoding feature for regions in background locations and disabling the encoding feature for regions in foreground locations, and partially enabling at least one feature for regions determined to have zero or near zero motion and disabling the feature for all other regions.

8. The method according to claim 1 wherein said encoding process comprises one of a group, said group comprising: a video encoding process, a High Definition video encoding process, a scalable encoding process, a scalable video encoding extension of the AVC/H.264 standard, a MPEG codec, a MPEG-1 codec, a MPEG-2 codec, a MPEG-4 Part 2 codec, a MPEG-4 AVC/H.264 codec, a VC1 codec, a Real Video codec, a On2 VP6NP7 codec, a Multi-view Video Coding extension of AVC encoding process, a field based encoding process and a field based encoding process performed in at least one of a picture level and a macroblock level.

9. The method according to claim 1 wherein said cross-contamination further comprises one of a group, said group comprising: luma contamination, chroma contamination, blocking contamination and stereo view contamination.

10. The method according to claim 2 wherein the step of evaluating further comprises one of a group, said group comprising: stereo disparity analysis, motion estimation analysis, luminosity analysis, analysis from multi-pass encoding, analysis from pre-processing and earlier passes, and Motion Compensation Temporal Filtering (MCTF) analysis.

11. The method according to claim 2 wherein the step of evaluating further comprises a cost process.

12. The method according to claim 11 wherein the cost process comprises a function of one of a group, said group comprising: computational costs and contamination costs.

13. The method according to claim 12 wherein cost process comprises a lagrangian cost function comprising $$J(\lambda) = \mu_{LV} * D_{LV}(R) + \mu_{RV} * D_{RV}(R) + \lambda * R$$

where $D_{LV}$ and $D_{RV}$ are distortion values for left and right images of the image pair, $\mu_{LV}$ and $\mu_{RV}$ are lagrangian multipliers associated with each image, R is an estimate or an actual bit-rate for selecting a coding mode comprising the encoding tools, and $\lambda$ is a lagrangian parameter for the rate parameter.

14. The method according to claim 13 wherein the method further comprises the step of exploiting Stereo View Masking (SVM) by applying at least one of the encoding features in an encoding process in cases where $\mu_{LV} > \mu_{RV}$ or $\mu_{LV} < \mu_{RV}$ resulting in a higher bias towards the quality of one view.

15. The method according to claim 13 wherein the method further comprises the step of exploiting stereo view masking (SVM) by providing a lower quality version of one of the stereoscopic pair of images and alternating the lower quality version between subsequent left and right views of the stereoscopic pair of images.

16. The method according to claim 13 wherein the method further comprises the step of exploiting stereo view masking (SVM) by providing a varying quality of at least one of the stereoscopic pair of images wherein the quality is selected based on a priority of the image.

17. The method according to claim 13 wherein the method further comprises the step of exploiting Stereo View Masking (SVM) by applying at least one of the encoding tools in an encoding process if an amount of cross-contamination in one of the images in either the encoding or corresponding decoding processes is above a first predetermined SVM cross-contamination threshold and an amount of cross-contamination in the other image in either the encoding or corresponding decoding processes is below a second predetermined SVM cross-contamination threshold.

\* \* \* \* \*